(12) United States Patent
Arnoux

(10) Patent No.: US 11,009,013 B2
(45) Date of Patent: May 18, 2021

(54) ENERGY CONVERSION DEVICE

(71) Applicant: FOURTH TRANSITION LIMITED, Co.Cork (IE)

(72) Inventor: Louis Arnoux, Gareoult (FR)

(73) Assignee: FOURTH TRANSITION LIMITED, County Cork (IE)

( * ) Notice: Subject to any disclaimer, the term of this patent is extended or adjusted under 35 U.S.C. 154(b) by 0 days.

(21) Appl. No.: 16/958,475

(22) PCT Filed: Dec. 21, 2018

(86) PCT No.: PCT/EP2018/086747
§ 371 (c)(1),
(2) Date: Jun. 26, 2020

(87) PCT Pub. No.: WO2019/129742
PCT Pub. Date: Jul. 4, 2019

(65) Prior Publication Data
US 2020/0355169 A1 Nov. 12, 2020

(30) Foreign Application Priority Data
Dec. 28, 2017 (EP) ..................................... 17306959

(51) Int. Cl.
*F03G 7/04* (2006.01)
*F03G 6/06* (2006.01)

(52) U.S. Cl.
CPC .............. *F03G 7/04* (2013.01); *F03G 6/064* (2013.01)

(58) Field of Classification Search
CPC ............. F03G 7/04; F03G 6/064; Y02E 10/46
(Continued)

(56) References Cited

U.S. PATENT DOCUMENTS 9,038,390 B1 * 5/2015 Kreuger .................. F03G 6/065
60/655
9,316,404 B2 * 4/2016 Gurin ...................... F24D 11/02
(Continued)

FOREIGN PATENT DOCUMENTS

DE 2818543 A1 10/1979
DE 102007027725 A1 12/2008
EP 0045179 A2 2/1982

OTHER PUBLICATIONS

International Search Report issued in corresponding International Application No. PCT/EP2018/086747, dated Mar. 25, 2019, pp. 1-4, European Patent Office, Rijswijk, Netherlands.

*Primary Examiner* — Hoang M Nguyen
(74) *Attorney, Agent, or Firm* — Hauptman Ham, LLP

(57) ABSTRACT

An energy conversion device comprising at least one thermal energy input, a plurality of energy outputs, a first modular part and a second modular part, wherein: the first modular part comprises at least a core Brayton generator; the second modular part comprises at least a heat pump module comprising at least one heat exchanger; and wherein the heat pump is integrated with the first modular part in order to share at least one heat exchanger between the first and the second modular parts, as well as set of valves and variable speed mechanical coupling and gear box. The core Brayton generator comprises an expander module and a compressor module configured to be positive displacement machines of the screw type with the expander module supplying motive power to the second modular part.

18 Claims, 3 Drawing Sheets

(58) Field of Classification Search
USPC .......................................... 60/650, 682–684
See application file for complete search history.

(56) References Cited

U.S. PATENT DOCUMENTS

| | | | |
|---|---|---|---|
| 9,394,807 B1* | 7/2016 | Kreuger | .................. F01K 25/08 |
| 2011/0030404 A1* | 2/2011 | Gurin | .................... F25B 27/002 |
| | | | 62/235.1 |
| 2015/0069758 A1 | 3/2015 | Davidson et al. | |

* cited by examiner

ENERGY CONVERSION DEVICE

The present application is a National Phase of International Application Number PCT/EP2018/086747, filed Dec. 21, 2018, which claims priority to European Application No. 17306959.2, filed Dec. 28, 2017, and are hereby incorporated by reference in their entirety into the present application.

TECHNICAL FIELD

The present invention relates to energy conversion systems. More precisely the invention relates to an energy conversion device of high efficiency, for point-of-use generation of all the energy streams that an end-user may require.

BACKGROUND

In recent years, the entire domain of energy supply and use, globally, has entered a critical phase, meaning both a period of increasingly acute energy related crises and one when very substantial opportunities for new technology developments present themselves in response to this evolving situation.

Although many individual aspects of the above have been widely publicised over the last decade, few people are aware, and understand the nature and magnitude of the rapidly mounting challenges that humankind now must face and even less regarding how and why these challenges critically impinge on crucial choices concerning energy technology developments. Few understand that these challenges require a radical reengineering of all energy, transport and communications infrastructures and that this reengineering does require the development of an entirely new class of networked energy technologies.

Instead, until recently attempts at addressing the infrastructure issues resulting from global energy and ecological challenges have remained piecemeal, focusing essentially on attempts to marginally adapt existing systems. People knowledgeable in the art will be aware that such adaptations include, for example, improving existing power grids using so-called "smart meters" or improving marginally the efficiency of energy use at the end user level but that such improvements do not tackle the overall energy losses within the bulk of energy infrastructures that result in a total inefficiency of about 88% at the global level. Another typical example concerns developing hybrid or electric vehicles without tackling the resulting consequences at power supply and distribution levels and without considering that fleet replacement can no longer take place within the required time frame imposed by the rapidly declining net energy per barrel, net energy that is essentially supplied by the oil industry in the form of transport fuels and that is now trending towards nil within 15 years at most on the one hand and on the other hand by the ecological, notably climate change matters resulting from the huge surge of fossil fuels since 1900. Similarly the development of new technologies such as photovoltaic or wind turbine technologies is essentially taking place in a piecemeal fashion within existing frameworks, that is, essentially within a centralised model dispatching energy from a central point of production and command, such as a central power station or an oil refinery. The resulting effect is that overall energy efficiencies remain far too low and that this, in itself, prevents achieving sustainable ways of life for humankind.

While it is now becoming recognised that shifting to highly distributed forms of power generation integrated in so-called intelligent networks is necessary to achieve sustainability, there is also a slow realisation that current approaches are unlikely to deliver what is required as exemplified, for example, in current debates concerning intelligent or smart grids.

In fact, until now few have recognised to which extent the emerging challenges require a zero-based approach, that is a reconsideration of infrastructure matters without relying on what is taken for granted, habit, preconceptions or beliefs, and instead beginning from the most fundamental expressions of the challenges that have to be faced and from first principles concerning the technologies able to meet those challenges.

Most of the solutions for converting energy use additive pieces of several technologies in order to convert a first kind of energy into electricity for example. The main problem of these additive solutions is the cumulative losses of energy incurred at each step of the systems leading to a very low overall efficiency.

An objective of the present invention is to provide a solution to solve at least part of these various problems.

SUMMARY

The present invention relates to an energy conversion device comprising at least one thermal energy input, a plurality of energy outputs, a first modular part, called the Primary Energy Side (PES), and a second modular part, called the End-Use Side (EUS), wherein:

The first modular part comprises at least a Brayton generator comprising at least one heat exchanger;

The second modular part comprises at least a heat pump module comprising at least one heat exchanger;

And wherein said heat pump is integrated in the first modular part in order to share at least one heat exchanger between the first and the second modular parts;

And wherein the Brayton generator comprises an expander module and a compressor module configured to be positive displacement machines of the screw type with the expander module supplying motive power to the second modular part.

The present invention relates also to an energy conversion device comprising at least one thermal energy input, a plurality of energy outputs, a first modular part and a second modular part, wherein:

The first modular part comprises at least one thermal energy input among said at least energy input and at least a core Brayton generator;

The second modular part comprises at least one energy output among said plurality of energy outputs, and comprises at least a heat pump and at least a heat exchanger;

and wherein said heat pump cooperates with the core Brayton generator so that an output of a first heat exchanger of the core Brayton generator is connected to an input of a heat exchanger of the heat pump;

and wherein the core Brayton generator comprises a compressor module and an expander module coupled with said compressor module, said compressor module being configured to be a positive displacement machine of the screw type, with the expander module being configured as a positive displacement machine of the screw type and supplying motive power to at least a compressor of the heat pump;

and wherein the energy conversion device comprises at least:
- a plurality of heat exchangers, preferably split between the first modular part and the second modular part, said plurality of heat exchangers comprising at least:
  - said first heat exchanger of the core Brayton generator,
  - said heat exchanger of the heat pump,
  - a second heat exchanger of the core Brayton generator,
  - said heat exchanger of the second modular part,
  - each heat exchangers of said plurality of heat exchangers comprises at least a heating part comprising at least a heating output and at least a heated part comprising at least a heating input, wherein so that said heat pump cooperates with the core Brayton generator so that at least one heating output of said first heat exchanger of the core Brayton generator is connected to at least one heating input of the heat exchanger of the heat pump, and at least one heating output of said second heat exchanger of the core Brayton generator is connected to at least one heating input of said heat exchanger of the second modular part;
- The first modular parts and the second modular part share said plurality of heat exchangers.
- a mechanical coupling and gear box module comprising a plurality of mechanical outputs configured to transfer mechanical energy from the first modular part to the second modular part, this plurality of mechanical outputs being configured so that the mechanical energy transferred by each mechanical output of the plurality of mechanical outputs can be varied relatively to one another, preferably continuously and smoothly, by smoothly, one means that the variation is realized without interruption;
- a set of valves being configured to enable varying energy transfers between the first modular part, the second modular part and said plurality of energy outputs in function of the variations of the mechanical energy transferred by the plurality of mechanical outputs from the first modular part to the second modular part; and
- a communication module receiving, preferably in real time, end-user energy flow requirements, preferably through at least one communication link and/or at least one broadband communication exchange link, this communication module being configured to operate at least both the plurality of mechanical outputs and the set of valves, in function of:
  - at least a variable speed generator and electronic control module and a first DC/AC power electronics and controls module, and
  - said end-user energy flow requirements.

Therefore, the present invention enables to match with, preferably at all times, said end-user energy flow requirements.

The first modular part and the second modular part are sides of a single system and are integrated through partly shared heat exchangers. Sharing some piece of technologies between these two parts of the same device allows reducing and optimizing the size of the device, reducing losses due to additive parts in the energy conversion, and finally enables to increase the efficiency of the energy conversion device by using any kind of energy sources which could be found inside the device itself like the heat losses.

The use of screw machines enables high efficiency and enables to keep the torque curve very flat over a wide range of rotations per minutes (rpms). The indirect heating enables a wide range of primary energy inputs.

For the avoidance of doubt, the difference between integrative and additive designs has to be noted in this description. For example, traditional combined heat and power (CHP) systems or trigeneration systems, that is, combining power generation, heating and chilling, are additive systems adding sequentially a power generation unit plus some means of recovering waste heat, plus some means of chilling such as adsorption chillers. Instead, in the present invention the system is integrative with heat exchangers, variable speed coupling, a set of valves and a set of control, management and communications modules being shared by the first and second modular parts. This integrative design enables a substantial reduction in overall equipment costs and a substantial increase in energy efficiency as well as varying in real time and largely independently from each other the mechanical, electrical as well as hot and cold energy flows delivered to end-users so as to meet at all times end-user energy requirements. None of those advantages can be readily provided by additive designs.

It has to be noted further that in this description, the term "positive displacement machine of the screw type" is used for any kind of positive displacement machine of the screw type and/or a variety of quasi positive displacement machines and/or so-called quasi turbines, such as involving pistons operating in expansion mode only, or adapted Pelton or other impulse designs, and/or reactive machines taking advantage of the fluid mechanics and/or rapidly moving surfaces at small scales, as typically observed with insect wings rapidly beating in air.

The present invention relates also to an energy network comprising a plurality of energy conversion devices according to the present invention.

This allows responding to the end-user energy requirements by managing the network of energy conversion devices depending on the energy sources available.

This summary is submitted with understanding that it will not be used to interpret or limit the scope or meaning of the claims. This summary is not intended to identify key features or essential features of the claimed subject matter, nor is it intended to be used as an aid in determining the scope of the claimed subject matter.

BRIEF DESCRIPTION OF THE DRAWINGS

The above and further features of the invention include various novel details of the components' construction and combination. These novel features will be more particularly pointed out in the following claims, and their advantages will also become evident as they are described in detail with reference to the accompanying drawings, in which:

Figure 1:
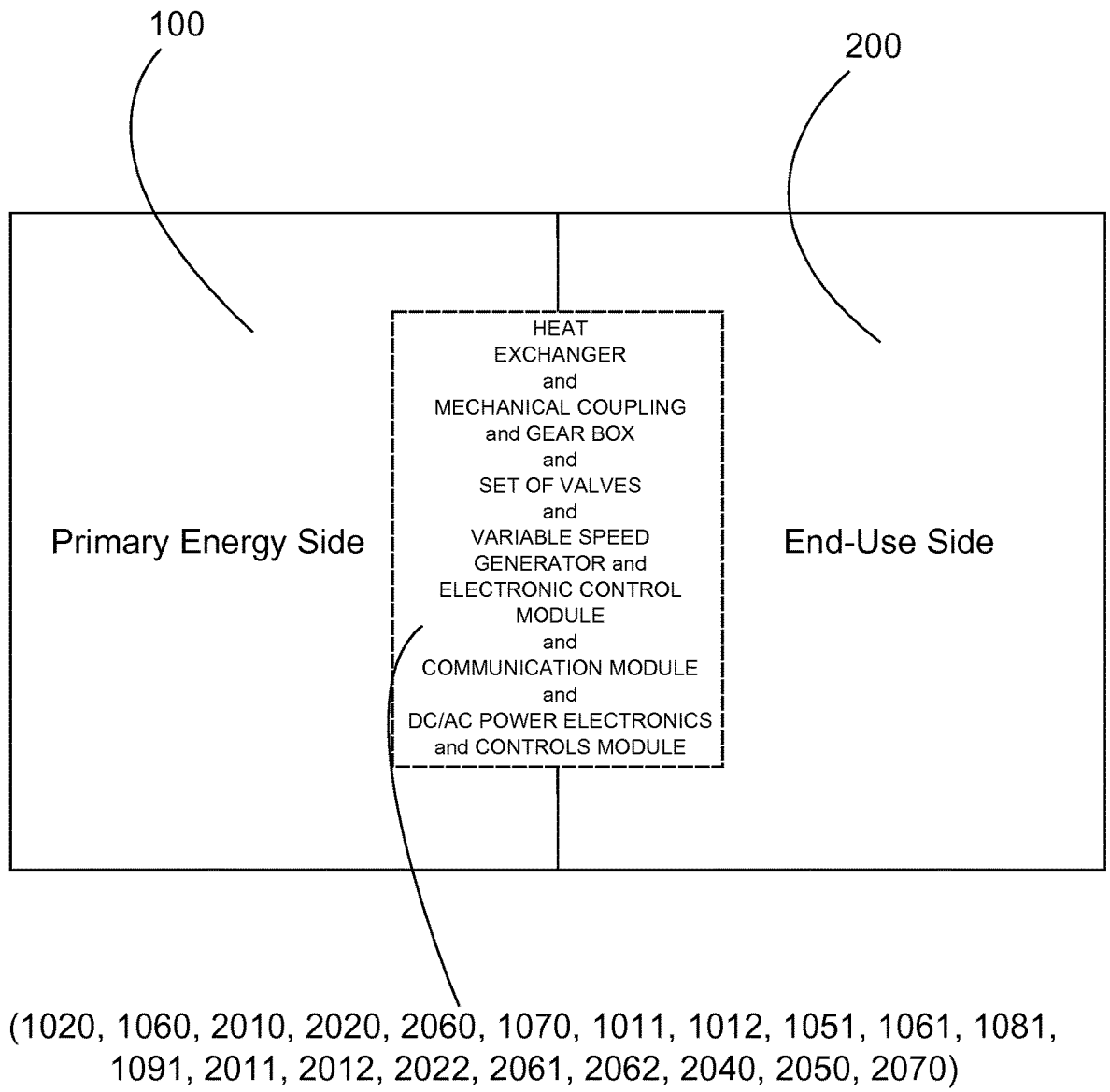
FIG. 1 depicts a simplified schematic of the energy conversion device according to a particular embodiment of the present invention.

The figures are given as examples and are not restrictive to the invention. They are principle schematic representations intended to facilitate the understanding of the invention and are thus not necessarily at the same scale as the practical applications. More particularly, the relative dimensions of the various components of the devices are not representative of reality.

DETAILED DESCRIPTION

Reference will be made in detail to the exemplary embodiments implemented according to the disclosure, the examples of which are illustrated in the accompanying will be used throughout the drawings to refer to the same or like parts.

Before providing below a detailed review of embodiments of the invention, the optional characteristics that may be used in association or alternatively will be listed hereinafter:

Advantageously, the core Brayton generator, also referred to as the Brayton generator, is configured to operate an indirect heating recuperated Brayton-Ericsson cycle.

This enables a wide range of primary energy inputs and the direct use of a clean airflow in the EUS, and in end-user's systems.

Advantageously, the Brayton generator is configured to operate a direct heating recuperated Brayton-Ericsson cycle.

This enables the present invention to present a reduced size as well as a reduced weight, allowing for example its implementation in vehicles.

Advantageously, the first modular part and the second modular part share an electronic control module in order to manage each of the two modular parts, and a communication module.

The electronic control module is configured to operate the valves in order to regulate the different energy flows inside the energy conversion device. The communication module enables to send and receive data concerning on the one hand the state of the energy conversion device for example, and on the other hand any command signal to manage the device remotely.

Advantageously, the first modular part and the second modular part share an electronic control module and a set of electronically operated valves in order to manage each of the two modular parts, and a communication module.

The electronic control module is configured to operate the valves in order to regulate the different energy flows inside the energy conversion device and the energy flows delivered to end-users. The communication module enables to send and receive data concerning on the one hand the state of the energy conversion device for example, and on the other hand any command signal to manage the device remotely.

Advantageously, the indirect heating recuperated Brayton generator is configured to operate as an open cycle.

This enables the present invention to be simple of use, since using ambient air, as well as reducing the cost of production of the present invention.

Advantageously, the indirect heating recuperated Brayton generator is configured to operate as a closed cycle.

This enables the possibility to use non-corrosive gases at high temperature beyond what is currently achievable with ambient air (that always contain some moisture that gets corrosive at very high temperatures).

Advantageously, the indirect heating recuperated Brayton generator uses as working fluid at least one fluid taken among: nitrogen, carbon dioxide or other suitable gases such as helium.

This enables the ability to use high temperatures and advantageously higher temperatures than in the prior art and to increase efficiency.

Advantageously, the first modular part comprises a primary energy input module and a primary heater module, and the primary energy input module is linked to the at least one thermal energy input, and is configured to bring thermal energy to the primary heater module.

This can be an interface to a supply of waste heat from an industrial process, a burner able to burn a range of fossil fuels and/or a burner adapted to burn a range of biomass products.

Advantageously, the primary energy input module receives energy derived from at least one renewable energy source taken among: solar thermal, photonic, and biomass for example) but also and indifferently from fossil resources.

This allows the present invention to use any kind of renewable energy, and then to switch in real time between any of them depending of the energy sources available as well as the end-user's requirement.

Advantageously, the primary energy input module receives energy derived from fossil resources.

This enables use in existing transport vehicles while substantially reducing fuel requirements (and thus pollution and emission of GHGs) relative to internal combustion engines.

Advantageously, the primary heater module is split in two parts, the first part is configured to supply heat to indirect heating recuperated Brayton generator, and the second part is configured to transfer heat from the first modular part to the second modular part.

This enables varying the heat flows to the expander of the first modular part and to second modular part, and by the same move, varying the regime of the expander of the first modular part.

Advantageously, the primary heater module is configured to thermally supply the expander module.

Advantageously, the second modular part comprises at least one variable speed generator module, and the expander module is configured to power the variable speed generator module.

This enables supplying electricity as well as mechanical power to EUS and end-user.

The combination of screw expander and variable speed generator enables varying power supply with a very flat torque curve over a wide range of rpms, i.e. retaining high efficiency over a wide range of operating regimes and minimization of primary energy inputs.

Advantageously, the second modular part comprises at least one ancillary DC/AC power electronics and controls module.

This enables supplying electricity to the EUS and to the end-user via a variable electrical power output.

Advantageously, the expander module is coupled to the compressor module.

This allows transferring the energy from the expander module to the compressor module.

Advantageously, the coupling between the expander module and the compressor module is done by a mechanical coupling module.

This enables to manage the temperature on the expander side of the coupling resulting in dilatations when moving from cold start to hot.

Advantageously, the first modular part comprises an energy storage module, and the compressor module receives energy supply from the energy storage module.

This allows enabling black starts independently from any other power supply source.

Advantageously, the energy storage module is at least any energy storage module taken among: high-pressure vessel for compressed air storage, electrical battery and starter motor.

This allows enabling black starts independently from any other power supply source.

Advantageously, the first and second modular parts comprise and share a set of valves, and at least a part of this set of valves is configured to enable heat transfers within the first and second modular parts and between these parts.

The use of this set of valves allows controlling the present invention in an intelligent way with a high degree of precision in terms of temperatures and heat flows.

Advantageously, the first modular part comprises a recuperator module, and the recuperator module is configured to transfer exhaust energy from the expander module and from the compressor module to the primary heater module.

This recuperator module transfers heat from expander module's exhaust gas in part to the primary heater module, and in another part to the hot side of the EUS heat pump in such a way that the relative heat flows that stay in the PES or that are diverted to the EUS can be varied through electronically operated valves.

Advantageously, the recuperator module is a heat exchanger made of suitable refractory materials and receiving the exhaust from the expander module in order to recycle as much as possible of the residual heat still in the exhaust flow.

This allows optimizing the use of the heat produced inside the energy conversion device.

Advantageously, the recuperator module in split in at least two parts, the first part being configured to supply heat to an operating fluid between the compressor module and the primary heater, and the second part is integrated to the heat pump.

This enables the multiplicity of independent EUS flows.

Advantageously, the operating fluid is taken among: pressurised air, carbon dioxide, nitrogen, helium or any other suitable dry gas and in particular any other cost effective fluid not causing high temperature corrosion.

This allows the present invention to be used regarding several restrictions in terms of operating fluid depending of the end-user's requirements.

Advantageously, the first modular part comprises a mechanical coupling and gear box module.

This allows generating motive power at variable speeds as well as varying smoothly the transfer of energy from one module to another one requiring mechanical energy, in particular between the first and second modular parts (PES and EUS).

Advantageously, the heat pump in the second modular part comprises at least a heat pump compressor module, heat pump heating exchanger module, heat pump cooling exchanger module and is reversible.

This enables supplying end-user heat flows over a wide range of temperatures, including going easily down to minus 80° C. in applications where this is advantageous, e.g. freezing, frozen food stores, etc. . . . .

Advantageously, the second modular part comprises at least a waste heat recovery heat exchanger module.

This module is configured in order to decrease any loses of heat inside the present device.

Advantageously, the set of valves comprises at least a plurality of electronically actuated regulating valves.

This enables varying smoothly the distribution of energy flows within and between the two modular parts and the various forms of output energy delivered to end-users from the second modular part (EUS) so as to meet at all times each of the varying end-user energy requirements and varying such end-use energy output flows largely independently from one another.

Advantageously, the present invention comprises a second compressor module mechanically powered by rotational mechanical power supplied from the mechanical coupling and gearbox module in order to store energy in at least one energy storage module.

This enables the energy conversion device to have and retain black start functionality, that is, to be able to be started on a stand-alone basis once the energy storage module has been loaded at commissioning time.

The invention relates to an energy conversion device of high efficiency for the point-of-use generation of all the energy streams that an end-user may require (electricity, process heat, hot water, air conditioning, refrigeration and freezing, as well as motive power). According to an embodiment, all the energy streams are able to vary over time largely independently from one another.

Advantageously, the present invention uses a wide range of primary energy inputs (such as fossil fuels, biomass derived fuels, concentrated thermal solar influx, waste heat from industrial processes) and is preferably remotely controlled and operated.

The present invention achieves solving the problems presented in the Background section by emulating the thermodynamics of complex living systems, while at the outset making use only of well-proven, existing technology. Doing so requires the cascading of free energy through a series of energy conversions from low entropy to high entropy release of low temperature waste heat to the environment right where the point-of-use device is advantageously located.

The lowest the entropy at the primary energy input the better. In practice this means achieving the highest possible temperature at that point and using technologies enabling high efficiency conversions all the way to the waste heat final exit point to the device environment.

According to an embodiment, the present invention relates to an energy conversion device which is adapted to cascade free energy flows through a series of energy conversion processes substantially towards increasing entropy for the delivery of a variety of energy streams of differing entropy levels to end-use processes or to export to other locations (from higher-grade, low entropy to lower-grade higher entropy, for example reserving electricity to uses that are better fulfilled through electricity supply or that require it such as computer operation and using waste heat recycling for hot water or space heating purposes).

According to an embodiment, the present energy conversion device achieves the above by integrating an indirect heating, recuperated, Brayton-Ericsson cycle module as the low entropy, primary energy end with, at the end-use end, a heat pump module, and optionally a range of electricity generation modules, including for example a variable speed generator module and ancillary DC/AC power electronics and controls module, and direct heat to electricity conversion modules.

Figure 2A:
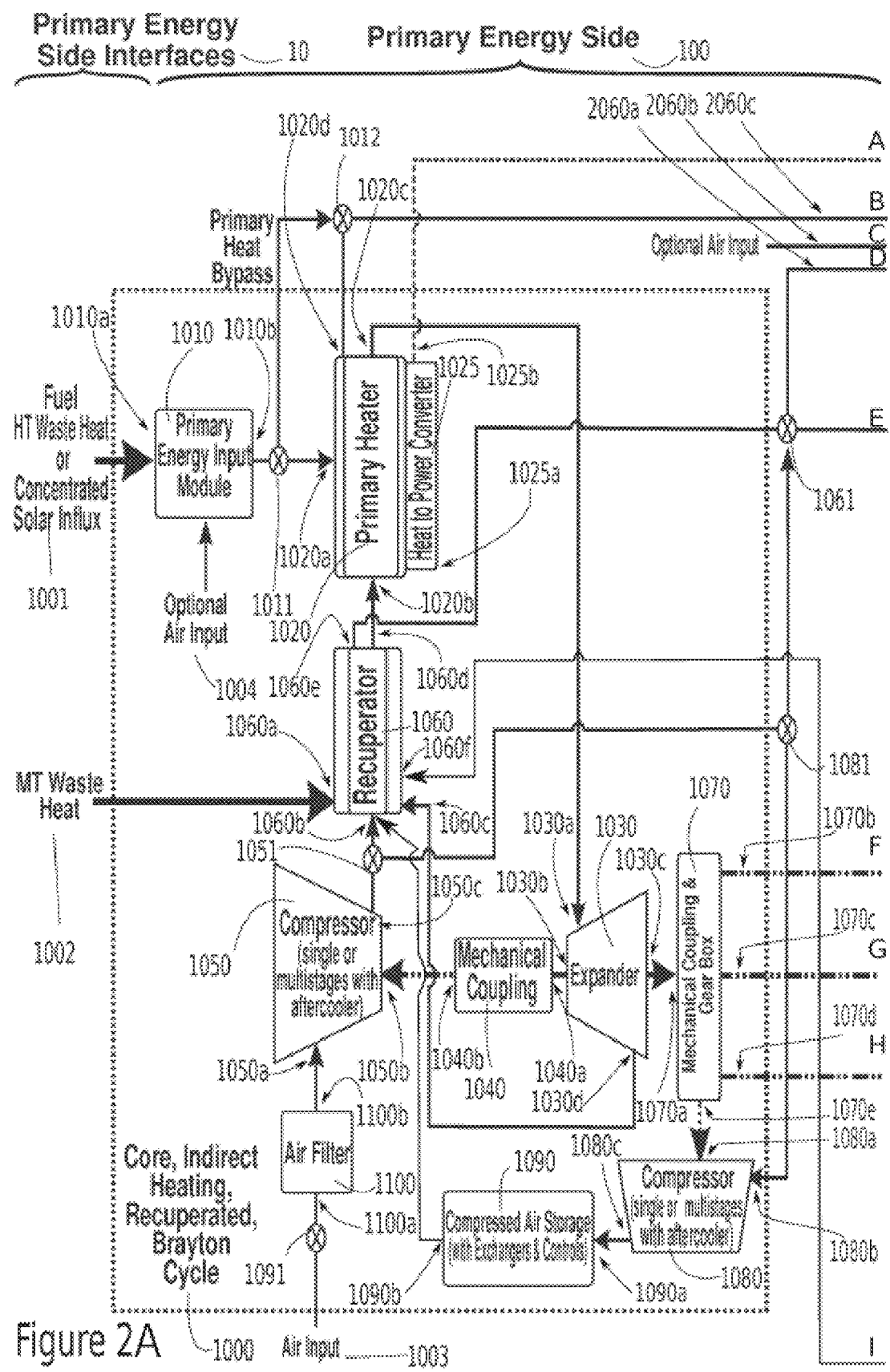
FIGS. 2A and 2B depict a detailed view of the present invention according to a preferred embodiment.
Figure 2B:
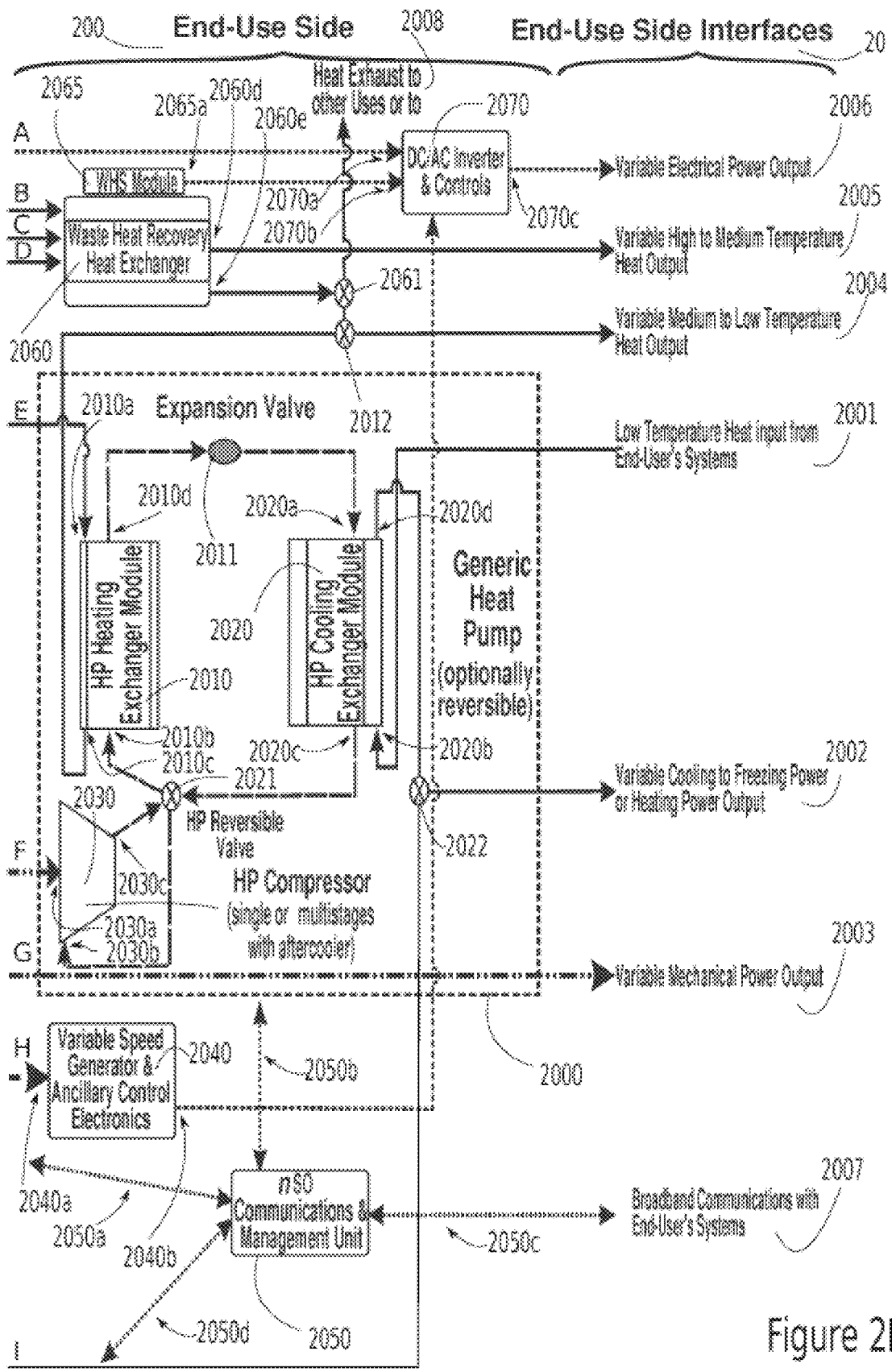

The present invention, as illustrated by the FIGS. 1, 2A and 2B, relates to an energy conversion device comprising preferably a first modular part, named Primary Energy Side (PES) 100, and a second modular part, named End-Use Side (EUS) 200.

According to an embodiment, the PES 100 handles at least one primary energy input (1001, 1002) whereas the EUS 200 is configured to deliver a range of variable energy flows (2002, 2003, 2004, 2005, 2006, 2007, 2008) to a range of end-uses on end-user's premises.

The range of variable energy flows (2002, 2003, 2004, 2005, 2006, 2007, 2008) covers most or even all of the possible energy requirements of an end-user in industrial, commercial, agricultural or residential settings, including mechanical power, electrical power, high, medium, low temperature heat, hot water, air conditioning, refrigeration, and freezing with the integration of the PED 100 and EUS 200 modular parts enabling varying these energy flows largely independently from each other and regulating them so as to meet at all time the varying end-user requirements.

According to a preferred embodiment illustrated by the FIG. 1, the PES 100 and the EUS 200 are not separate additive components. They are two sides of a single integrated device. The PES 100 and the EUS 200 are integrated through partly shared heat exchangers (1060 and 2010 on the one hand and 1020 and 2060 on the other hand), a set of valves (1011, 1012, 1051, 1061, 1081, 1091, 2011, 2012, 2021, 2022, 2061), a mechanical coupling that incorporate a variable speed gear box (1070), and electronic control and communication modules used to manage the overall device (2040, 2050 and 2070).

The modular parts PES 100 and EUS 200 are integrated by sharing heat exchangers, valves, variable speed mechanical energy transfers, and means of control and management, instead of the multiple additions of such components found in traditional combined heat and power (CHP) systems or in trigeneration systems, that is, combining power generation, heating and chilling. This integrative design enables a substantial reduction in overall equipment costs and a substantial increase in energy efficiency as well as varying in real time, smoothly and largely independently from each other the mechanical, electrical as well as hot and cold energy output flows (2002, 2003, 2004, 2005, 2006, 2007, 2008) delivered to end-users, and/or to PES 100, so as to meet at all times end-user energy requirements. None of those uses can be readily provided by additive designs.

According to an embodiment, the present invention operates as an interface between end-user energy and information using processes on the one hand and the primary energy and information supplying systems on the other, and consists of the two integrated sides: the PES 100 effecting conversions of primary energy sources into useful power, which is adapted to preferably maximise electrical and/or mechanical power generation, and the EUS 200 that interfaces with and provides enmeshing of the PES 100 with the end-user processes through carrying out further energy conversions in such a way that the two-sided system maximises overall energy efficiency with respect to dynamically changing end-user requirements.

Advantageously, both the PES 100 and the EUS 200 are built with modules that are preferably easily interchangeable and that vary in size so that energy conversion device can be assembled in a variety of sizes (for example expressed in terms of overall power rating).

According to an embodiment, the modules can be individually built to suit specific end-user requirements (such as in terms of the nature and rates of required end-user energy flows).

According to another embodiment, the modules can be upgraded to match evolving end-user requirements.

Advantageously, the energy supplied to the present invention using the primary energy input module 1010 is derived preferably from renewable energy sources (such as solar thermal, photonic, and biomass for example) but also and indifferently from fossil resources.

The present invention manages the energy cascading explained earlier so as to achieve maximum energy efficiency in a distributed manner, match and manage highly variable variety requirements between energy flow supply and demand functionality.

Advantageously, this energy management is made with variations ranging from very short term, millisecond order of magnitude, through hourly, daily, seasonal, to yearly fluctuations. This allows the present invention to use several kinds of renewable energies. This also allows managing and meeting the needs of the end-user.

According to an embodiment, the present system is sized and otherwise specified in order to meet at all-time substantially the local requisite variety of end-user processes on the one hand and that of the supplying energy and information systems on the other and simultaneously cascade local energy flows towards increasing entropy so as to locally achieve maximum power and energy efficiency.

According to an embodiment illustrated by the FIGS. 2A and 2B, the PES 100 comprises means of high efficiency motive power generation, for example a Brayton Generator (CBG) 1000, and a number of complementary modules integrated with said Generator. The core Brayton generator is also referred to as a Brayton generator.

The PES 100 comprises, according to one preferred embodiment, at least one module among:
  A CBG 1000 comprising at least one module among:
    A primary energy input module 1010;
    A primary heater module 1020;
    An expander module 1030;
    A compressor module 1050;
    An air filter 1100;
    An energy storage module 1090;
    A recuperator module 1060;
    A mechanical coupling and gear module 1040;
    A mechanical coupling and gear box module 1070;
  A set of valves (1011, 1012, 1051, 1061, 1081, 1091) the operation of which is shared with EUS 200;

According to an embodiment, the PES 100 has at least one thermal energy input 1001. This one thermal energy input is configured to receive any kind of thermal energy such as for example: fuel, high temperature waste heat, concentrated solar influx, high temperature geothermal heat flows, etc. . . . . The said thermal energy can be liquid fuels (e.g. diesel, bio-oils), gaseous fuels (e.g. natural gas, biogas, waste heat in exhaust gases from industrial processes) or radiative such as in concentrated solar influx—pressurized hot water is possible but achievable temperatures tend to be low so would require other primary inputs to reach high temperatures, preferably above 1000° C.

The use of several different kinds of primary input energy allows the present invention to be adaptable depending on its environment in terms of energy sources. This allows the present invention to be able to deliver energy to the end-user even if one kind of energy sources is not available. Preferably, an automatic switching between one kinds of energy source to another one is done when the present invention detects, via at least one electronic control module 2050, any significant fluctuation in the energy source.

The energy input 1001 is preferably linked to the primary energy input module 1010.

The EUS 200 comprises, according to one preferred embodiment, at least one module among:
- A heat pump module 2000 comprising at least one module among:
  - A heat pump compressor module 2030;
  - A heat pump heating exchanger module 2010;
  - A heat pump cooling exchanger module 2020;
- An electronic control module 2040 shared with the PES 100;
- An electronic communications and management module 2050 shared with the PES 100;
- A waste heat recovery heat exchanger module 2060 shared with the PES 100;
- A variable speed generator module 2040;
- A DC/AC power electronics and controls module 2070;
- A set of valves (2011,2012,2021,2061);

In the present description, the expression "A is connected to B" can include the expression "A is directly connected to B". By directly, one means for example that there is at least one fluidic connection between A and B and that this at least one fluidic connection does not comprise any organ between A and B except one or several valves or pipes for example.

In the present description, the expression "C connects A to B" can include the expression "C directly connects A to B" meaning that A is directly connected to B.

According to an example illustrated by FIGS. 2A and 2B, the first heat exchanger 1020 is directly connected to the first expander module 1030.

According to an example illustrated by FIGS. 2A and 2B, the first expander module 1030 is directly connected to the mechanical coupling and gear box module 1070.

According to an example illustrated by FIGS. 2A and 2B, the mechanical coupling and gear box module 1070 is directly connected to the first heat pump compressor 2030.

According to an example illustrated by FIGS. 2A and 2B, the second heat exchanger 1060 is directly connected to the first heat exchanger 1020.

According to an example illustrated by FIGS. 2A and 2B, the third heat exchanger 2010 is directly connected to the Fourth heat exchanger 2020.

Now the Brayton-Ericsson adaptation of the Brayton cycle, also called the Joule cycle, will be briefly described. This thermodynamics cycle is well known and has had numerous applications most specifically concerning the use of gas turbines such as in jet engines. Experts in thermodynamics are well aware that although this cycle is named after George Brayton (1830-1892), the American engineer who developed the Ready Motor, it was originally proposed and patented by Englishman John Barber in 1791.

The Brayton cycle is mainly used in order to describe the workings of a constant pressure heat engine. Gas turbine engines and air breathing jet engines use the Brayton cycle. Although the Brayton cycle is usually run as an open system (and indeed must be run as such if internal combustion is used), it is conventionally assumed for the purposes of thermodynamic analysis that the exhaust gases are reused in the intake, enabling analysis as a closed system.

Regarding the Ericsson cycle, this one is similar to the Brayton cycle but uses external heat and incorporates the use of a regenerator. There are two types of cycles, open to the atmosphere and using internal combustion chamber, or closed and using a heat exchanger.

The Ericsson cycle is named after inventor John Ericsson, who designed and built many unique heat engines based on various thermodynamic cycles. He is credited with inventing two unique heat engine cycles and developing practical engines based on these cycles. His first cycle is now known as the closed "Brayton cycle", commonly applied to the rotary jet engines for airplanes, while his second cycle is what is now called the Ericsson cycle.

The second Ericsson cycle is the cycle most commonly referred to as simply the "Ericsson cycle". The (second) Ericsson cycle is also the limit of an ideal gas-turbine Brayton cycle, operating with multistage intercooled compression, and multistage expansion with reheat and regeneration.

Compared to the Brayton cycle, which uses adiabatic compression and expansion, the second Ericsson cycle uses isothermal compression and expansion, thus producing more net work per stroke. Also the use of regeneration in the Ericsson cycle increases efficiency by reducing the required heat input.

Then both Brayton and first Ericsson cycles use adiabatic compression, isobaric heat addition, adiabatic expansion, and isobaric heat rejection, while the second Ericsson cycle (1853) uses isothermal compression, isobaric heat addition, isothermal expansion, and isobaric heat rejection.

The thermodynamics of Brayton/Ericsson cycles are then well known. The efficiency of the ideal cycle is a function of the pressure ratio only while the work ratio depends also on the lower and higher temperatures in the cycle. The former is typically ambient temperature while the latter is limited by the properties of the materials used in the burner/heater and expander components. The work output is maximum for a value of the pressure ratio equal to the square root of the maximum pressure ratio. Taking into account inefficiencies in the various components, the cycle efficiency is a function of the pressure ratio and of the higher temperature. In practice this means that a simple Brayton cycle may achieve mechanical efficiencies around 30% only with pressure ratios around 7 to 9 and higher temperatures around 1000° K.

Given that in order to achieve higher mechanical efficiencies and flexibility of use of energy output streams the preferred configurations of the present invention uses external indirect heat input and incorporate a recuperator 1060, the present invention draws also from the earlier Ericsson cycle (1833). In the present invention, the compressor module 1050 and expander module 1030 approach isothermal operation. Thus the device is also in part related but not equivalent to the second Ericson cycle.

Advantageously, the CBG 1000 is structured as an open and/or closed cycle. In the closed cycle, the CBG 1000 is preferably built as a closed loop and instead of using air as working fluid, it uses nitrogen or carbon dioxide ($CO_2$) (supercritical or transcritical cycles) or other suitable fluids, which would require extra heat exchangers.

A closed loop system is advantageous in some applications, e.g. where large amounts of waste heat can be used as energy inputs, with one heat pump 2000 on the EUS 200 wholly or in part used to cool the input to the compressor module 1050 of the CBG 1000, which enables a high temperature differential between hot and cold side, while the temperature of the hot side remains lower than in the open cycle version.

According to another embodiment, the CBG 1000 is adapted to accept a wide variety of fuels and/or direct heat inputs 1001 such as waste heat recycling and solar thermal inputs, that uses air or other suitable gases (such as nitrogen, in the case of a closed-cycle version or helium depending on the operating temperature range) as the working fluid.

According to an embodiment, the CBG 1000 is multi-fuel allowing it to use different kinds of fuel to operate. This allows a great adaptability of the present invention.

According to an embodiment, the CBG 1000 comprises at least a compressor module 1050 and at least an expander module 1030. Advantageously, the compressor module 1050 and the expander module 1030 are positive displacement machine of screw type adapted to achieve maximum system efficiency. The use of screw machines enables high efficiency and keeping the torque curve very flat over a wide range of rotations per minute (rpms).

The use of screw machine is particularly advantageous for small sized energy conversion device, according to the invention, where the efficiency of gas turbines drops drastically towards zero with decreasing turbine sizes.

At the opposite, for large sized energy conversion device, according to the invention, for example above 500 kW, it is possible to use gas turbines for both compression and expansion, or only for expansion while still achieving high efficiency and variation of multiple energy outputs flows.

According to another embodiment, in terms of positive displacement machines, one can also consider piston machines and a wide range of rotary designs, such as those called "quasi-turbines" (see for example some of the publications by Saint-Hilaire et al.)

According to an embodiment, the CBG 1000 is configured to use indirect heating that enables a wide range of primary energy inputs 1001 and the direct use of a clean air flow in the EUS 200 and in end-user's systems.

According to an embodiment, the CBG 1000 comprises a primary heater module 1020. This primary heater module 1020 is advantageously configured to operate by indirect heating, i.e. with no combustion gases being mixed with the flow of heated compressed air or other gases. The primary heater module 1020 is then configured to receive indirect primary energy inputs 1001.

This primary heater module 1020 comprises optionally a heat receiver module combined with a primary heat exchanger module built of suitable refractory materials. Advantageously, the heat receiver module is adapted to be integrated with primary energy input module 1010 adapted as a burner module built of suitable refractory materials itself adapted to accept indifferently liquid and/or gaseous fuels, such as for example supplied from storage vessels, reticulation systems and/or onsite gasification or liquefactions systems.

According to an embodiment, the primary heat exchanger module is able to accept waste heat supplied from on-site processes.

According to another embodiment, the heat receiver is adapted to receive concentrated solar light, and the primary heat exchanger module is then adapted to impart heat to flows of compressed air or other suitable gases.

Advantageously, the heat exchanger module comprises two parts, with one part supplying heat to the CBG and the other part supplying heat to hot side of the EUS heat pump in such a way that the relative heat flows that stay in the PES or that are diverted to the EUS can be varied through electronically operated valves.

According to another embodiment, the primary heater module 1020 is optionally configured to operate by direct heating, i.e. with combustion gases being mixed with the flow of heated compressed air or other gases. The primary heater module 1020 is then configured to receive direct primary energy inputs.

The primary heater module 1020 is advantageously adapted to achieve a rapid heat transfer from the combustion to the input gas flow.

Optionally, the primary heater module 1020 has at least one component imparting additional isothermal heat such as the known use of a section of the exchanger component of the primary heater module 1020 having a tapered cross-section but, given that isothermal heat addition will lower the pressure and increase the velocity of the air, said design being advantageously adapted to avoid any undesirable supersonic flow.

Advantageously, the primary heater module 1020 of the PES 100 is fitted with a "heat to power" converter module 1025 configured to convert the heat inputs into electricity as commercially available and/or purpose designed and integrated to the primary heater module 1020. This heat to power converter module 1025 enables optimising the generation of power more independently from that of various forms of end-user heat flows.

According to an embodiment, the CBG 1000 comprises at least one expander module 1030, being the component that converts the energy in, for example, the compressed air flow (and/or other gases) into mechanical work. Advantageously, the expander module 1030 is adapted to have a high isentropic efficiency, said expander module 1030 being a twin-screw machine. Preferably, the expander module 1030 is built of materials able to operate at high temperature since the efficiency of this device is directly related to temperature. Alternatively, and for large power rating devices, a gas turbine in one or more stages may be used.

According to a preferred embodiment, the CBG 1000 comprises a compressor module 1050. This compressor module 1050 can comprises one or more stages as required by each specific application. This compressor module 1050 is preferably of the positive displacement type and within the range of positive displacement machines, preferably a twin-screw compressor. Preferably the compressor module 1050 has a very high isentropic efficiency, ideally above unity. Advantageously, this compressor module 1050, such as a water-lubricated compressor for example, has internal cooling and approaches an isothermal compressor.

With such compressor module 1050, it is possible to have variable capacity which can be achieved by valve lift and/or timing control on a reciprocating compressor or by variable displacement slide valves on a screw compressor or alternatively, and for large power rating device, a turbine compressor in one or more stages may be used.

According to an embodiment, the CBG 1000 comprises at least one mechanical coupling module 1040 positioning preferably between the expander module 1030 and the compressor module 1050 in order to transfer the mechanical energy from the expander module 1030 to the compressor module 1050.

According to another embodiment, the CBG 1000 comprises at least one recuperator module 1060 that is configured to be a heat exchanger. This recuperator module 1060 transfers heat from expander module's exhaust gas in part to the primary heater module 1020, and in another part to the hot side of the EUS 200 heat pump 2000 in such a way that the relative heat flows that stay in the PES 100 or that are diverted to the EUS 100 can be varied through electronically operated valves. The use of such electronic valves (1011, 1012, 1051, 1061, 1081, 1091) allows an automatic as well as an intelligent management of the present invention.

Advantageously, the heat from expander module's exhaust gas supplied to recuperator module 1060 can be augmented with recycled waste heat 1002 supplied from a variety of industrial processes.

Advantageously, the recuperator module 1060 is a heat exchanger made of suitable refractory materials and receiving the exhaust from the expander module 1030 in order to recycle as much as possible of the residual heat still in the exhaust flow. This allows optimizing the use of the heat produce inside the energy conversion device.

Optionally the CBG 1000 can comprises means of closing the circulation of air, or other gases, used as operating fluid in order to feed back, to the compressor module 1050, the exhaust gases from the expander module 1030 after they have passed through the recuperator module 1060.

Optionally, the CBG 1000 can comprise means for cooling of the operating fluid, such as through the heat pump exchangers of the EUS 100.

According to another embodiment, the CBG 1000 comprises at least one energy storage module 1090. This energy storage module 1090 can be advantageously configured to provide means of short-term energy storage enabling black starts of the present invention.

Advantageously, the energy storage module 1090 is in the form of a high-pressure vessel loaded with a heat storage particulate solid (such as rock and/or recycled glass for example).

Preferably, the energy storage module 1090 comprises ancillary valves and controls so that the heat storage solid enables heat transfers between the compression and expansion phases and ducted in such a way as to power the expander of the CBG 1000 for black starts independently from any other power supply source.

According to a particular embodiment, the CBG 1000 is fitted with a longer-term energy storage module. For example, this energy storage module is in the form of underground compressed air storage and/or high temperature heat storage. This enables buffering both heat and electricity supplies in cases of variations in primary energy input, such as form direct concentrated solar, but also from reticulated networks (e.g. gas and electricity). For example, in case of 100% solar-based primary energy input, the present invention can withstand fluctuations in supplies in the order of a week to a fortnight.

Whenever required as determined by management module 2050 shared with EUS 100, compressor 1080 is supplied mechanical power from gear box 1070 and medium pressure air from compressor 1050 via valves 1051 and 1081 to deliver high pressure compressed air to energy storage 1090 via input 1090a. Said energy storage 1090 enables black starts and depending on size of storage enables temporary operation of the energy conversion device in the absence of primary energy inputs 1001 and/or 1002.

According to an embodiment, the present invention comprises means of conversion of mechanical to electrical power in the form of one or more adapted variable speed generator modules 2040. The number of generators is advantageously dependent upon user requirements.

Preferably, the variable speed generator module 2040 is designed to generate power rating matching that of the mechanical parts of the CBG 1000. Optionally, the variable speed generator and ancillary control electronics module 2040 supplies current to DC/AC inverter and control module 2070 that incorporates electronics components, such as commercially available, adapted to output either direct or alternating current of the required voltages and frequencies and able to maintain clean sine wave forms in the output currents, remove undesirable harmonics and current spikes, and achieve a high power factor.

According to a preferred embodiment, the CBG 1000 comprises at least one mechanical coupling and gear box module 1070 configured to transfer mechanical energy from the expander module 1030 to the heat pump compressor module 2030 and/or to at least one variable speed generator module 2040, and/or to generate a variable mechanical power output 2003.

The mechanical coupling and gear box module 1070 is adapted so as to be able to vary smoothly from zero to full rotational speed and torque each of the mechanical outputs 1070b, 1070c, 1070d and 1070e in such a fashion that the total power of the outputs equals the available power supplied from expander 1030 to mechanical coupling and gear box module 1070 via the mechanical coupling from 1030c to 1070a. This set of variable couplings and mechanical energy transfers is managed in real time by communications and of management unit 2050 and control unit 2040 so as to meet mechanical power requirements of heat pumps 2000 of EUS 100 via output 1070b, end-user requirements concerning mechanical power output 2003 via output 1070c, electrical power output 2006, via output 1070d, variable speed generator 2040 and module 2070, and maintain energy storage 1090 at full capacity via output 1070e to compressor 1080.

According to a preferred embodiment, the present invention comprises at least one set of valves. Preferably, these valves are electronically piloted valves in order to be managed by electronics control modules 2040 and 2050, for example. Advantageously, these valves are positioned in the energy circuit of the device in order to manage automatically the device for example by simply opening, partly opening or closing or fully closing some of the plurality of valves.

The progressive opening or closing of each of the set of valves from fully closed to partly open to fully open and vice-versa is managed by the control modules 2040 and 2050 in such a way as to share and direct the respective energy flows between PES 100 and EUS 200 and within each of these two modular parts in order to meet the end-use energy requirements for EUS 200 energy outputs 2002, 2003, 2004, 2005, 2006, and input 1060f to 1060 of PES 100. The requirements are established by modules 2040 and 2050 via a set of flow, pressure, temperature and rotational speed sensors distributed as required in PES 100 and EUS 200 and simultaneously through communications by module 2050 with end-user systems.

According to an embodiment, the PES 100 comprises at least one set of valves (1011, 1012, 1051, 1061, 1081, 1091) and the EUS 200 comprises at least one set of valves (2011, 2012, 2021, 2022, 2061).

Advantageously, the combination of screw expander module 1030, with a very flat torque curve over a wide range of rpms and variable speed generator module 2040 enables varying power supply while retaining high efficiency over a wide range of operating regimes and minimization of primary energy inputs.

According to an embodiment, the EUS 200 comprises a DC/AC power electronics and controls module 2070. This enables supplying electricity to the EUS 200 and to the end-user via a variable electrical power output 2006.

According to another embodiment, the present invention comprises at least one electronic control module 2040 in order to manage at least a part of the energy conversion device according to the present invention. This management allows automatizing the device in order to operate at an optimized point of use.

According to another preferred embodiment, the CBG 1000 comprises at least one heat exchanger of the types used for intercoolers on forced-induction internal combustion engines and where multiple stages compression is required. Each stage consisting of at least one compressor and, as an option, an aftercooler (as part of 1050), with optionally incorporating a bleed air system that can be used to provide chilling and compressed air for accessories (for example, brakes in a vehicle or to feed toward further compressing stages for energy storage purposes at substantially higher pressures than the present invention's range of operating pressure) and/or, in vehicle applications where regenerative braking is used, such bleed air may be used on the overrun (with the expander module 1030 capacity reduced) to charge a compressed air tank, which may then be reintroduced at this point to recover the energy used to compress it.

Advantageously, the EUS 200 comprises at least one waste heat recovery heat exchanger module 2060. This module 2060 is configured in order to decrease any loses of heat inside the present device. Advantageously, the waste heat recovery heat exchanger module 2060 is fitted with a waste heat scavenging module 2065 that uses thermionic or thermoelectric devices, as currently under separate development to directly convert waste heat to electricity in order to generate extra power.

According to an embodiment, instead of indirect heating of the PES 100 it is possible to burn a fuel directly in the flow of air in the Brayton-Ericsson cycle, e.g. in the cases of use of natural gas, biogas, diesel, and other gaseous or liquid sprayable fuels. In which case the combustion gases can be heat exchanged before the final exhaust to environment such as in the waste heat recovery module 2060 and heat pump heating exchanger module 2010. This option has merits in some transport applications to reduce space and weight of the device. According to a preferred embodiment, the present invention comprises means of broadband communications and remote monitoring and management 2050 of the energy conversion device.

Optionally, the present invention comprises means of monitoring and management of end-user processes, equipment, premises and, further, optional means of providing broadband communications services and functionality to on-site end-users, being any suitable modular electronic devices 2050.

Advantageously, the present invention comprises means of thermal insulation adapted to minimise heat losses, along all ducting of gases, or other fluids, and around the PES 100 and EUS 200.

In a further aspect, the present invention comprises means of networking, interfacing and enmeshing the energy conversion device's components among themselves and with the energy using systems at or near the device location concerning all required energy flows such as by way of cabling, piping and ducting, electrical transformers, switches, valves, fans, pumps, mechanical coupling means and gear boxes, actuators, relays, motors and related suitable sensors (such as concerning temperature, pressure, flows, etc).

According to a preferred embodiment, the present invention uses several valves as well as electronic control modules 2040 and 2070 and a communication and management module 2050 in order to manage the energy conversion device. The electronic control modules are configured to operate the valves in order to regulate the different energy flows inside the energy conversion device. The communication module enables to send and receive data concerning, on the one hand, the state of the energy conversion device for example, and on the other hand any command signal to manage the device remotely.

This energy conversion device is configured to be adaptable to its possible energy sources as well as to the end-user requirements.

The present invention provides means of cooling, refrigerating, freezing and/or heating functionality used to meet users' requirements at or near the device site in the form of any suitable waste heat recovery exchanger and heat pump designs where, as mentioned earlier, the waste heat recovery exchanger and the hot side heat exchanger of the heat pump are the second parts of the recuperator module 1060 and primary heat exchanger module 1020 with the respective heat flows being regulated by means of electronically operated valves.

In one aspect the present invention provides a networked energy and communications system, energy conversion devices that generate and mediate local and non-local energy and communications flows by interacting in cybernetic fashion with the environment in which the flows occur. In particular the present invention takes into account interpretations of changes in said environment that may require management actions concerning said system and/or devices, through iterative heuristic sequences that the system uses to develop satisfactory outcomes, these actions being actions that satisfy requirements or criteria set by users or designers of the system.

In a further aspect the invention provides that the devices embodying the invention be integrated to form networkable devices located at or near distributed sites of energy use and adapted to achieve maximum efficiency of electrical power generation and maximum overall efficiency of energy use at the end-users' sites.

In a corollary aspect the invention provides that the energy conversion device according to the invention be installed in land, sea or air based vehicles either as adapted retrofits in replacement of existing engines in existing vehicles or adapted to new vehicles of existing designs and/or vehicles purpose-designed to be operating optimally with the present invention.

Thus, the present invention provides an integrated networkable system, such as may be used for energy and/or transport purposes that operates according to an adaptive and innovative thermodynamics and communications methodology. Further, the system according to the invention is expandable, practically without limitation, and may be implemented in a cost and infrastructure effective manner.

Furthermore, some of the features of the exemplary embodiments of this invention may be used to advantage without the corresponding use of other features. As such, the foregoing description should be considered as merely illustrative of the principles, teachings and embodiments of this invention, and not in limitation thereof.

Although the invention has been described by way of examples and/or with reference to particular embodiments, it is to be understood that modifications and/or improvements, such as may occur to those skilled in the art, may be made without departing from the scope of the appended claims.

The present invention is not limited to the embodiments described in the foregoing but extends to any embodiment in conformity with the claims.

REFERENCES

The list of reference below is only intended to ease the explanation of the invention and of the figures. For each of these references, the mentioned features shall not be considered as essential features and shall not restrict the scope of protection. The scope of the protection extends to alternative embodiments encompassed by the claims.

10. Primary Energy Side Interfaces: comprises a set of ports and regulating valves as can be sourced commercially and used to provide primary energy inputs to the energy conversion device through a variety of piping and valves or alternately focused photonic solar radiation.

20. End-Use Side Interfaces: comprises a set of ports and regulating valves, electrical bus and mechanical couplings as can be sourced commercially and used to provide a variety of energy flows from the energy conversion device to on site end-user energy using systems through a variety of electrical wiring and switches and/or motive shaft and couplings and/or piping and valves.

100. First modular part: comprises the set of components adapted to convert primary energy inputs from Primary Energy Side Interfaces 10 into the range of energy flows supplied to the Second modular part 200.

200. Second modular part: comprises the End-Use Side set of components adapted to convert the energy flows received from First modular part 100 into the energy flows supplied to End-Use Side Interfaces 20.

1000. Core Brayton generator: is the main system of First modular part 100 and comprises a set of components embodying a recuperated, indirectly heated, Brayton-Ericsson thermodynamic cycle where the compression and expansion stages are achieved by way of positive displacement machine of the screw type and where the heat exchangers are shared with Second modular part 200.

1001. First thermal energy input: a variety of main energy inputs to Primary Energy Input Module 1010 of Core Brayton generator 1000, through Input of the first primary energy input module 1010a, including liquid or gaseous fuels and/or optionally high temperature waste heat recycled from upstream industrial processes or alternately concentrated photonic solar radiation.

1002. Second thermal energy input: optional input of waste heat recycled from upstream industrial processes that is supplied, through First input of the second heat exchanger 1060a, to Second heat exchanger 1060.

1003. First air input: ambient air input to Air Filter 1100 of Core Brayton generator 1000 through Sixth valve 1091.

1004. Second air input: ambient air input to Primary Energy Input Module 1010 to enable combustion of fuel supplied through Input of the first primary energy input module 1010a and/or temperature regulation of Primary Energy Input Module 1010 or alternately, in another embodiment where the First thermal energy input 1001 is concentrated solar photonic radiation, compressed air diverted from First output of the second heat exchanger 1060d (through piping and regulating valve not shown on FIGS. 2A and 2B).

1010. First primary energy input module: comprises an thermally insulated chamber with refractory internal walls where flows from First thermal energy input 1001 mixes with Second air input 1004 and fuel combustion takes place, an optional lighting device to initiate combustion, and components regulating flows 1001 and 1004, or alternately in another embodiment where the First thermal energy input 1001 is concentrated solar photonic influx, an thermally insulated chamber with refractory internal walls containing piping receiving compressed air from Second air input 1004 and components regulating flows of concentrated photonic solar radiation 1001 and Second air input 1004.

1010a. Input of the first primary energy input module: a variety of fuel injection devices and/or ports, interchangeable and specific to each First thermal energy input 1001 fuel that inject it to First primary energy input module 1010 or alternately that open and closes First primary energy input module 1010 in the case of First thermal energy input 1001 being concentrated photonic solar radiation.

1010b. Output of the first primary energy input module 1010: port that connects First primary energy input module 1010 to downstream thermally insulated piping delivering hot gases from 1010 to First valve 1011.

1011. First valve: three way regulating valve that receives hot gases from First primary energy input module 1010 and directs them in part or wholly to First input to of the First heat exchanger 1020a and/or Second valve 1012.

1012. Second valve: three way regulating valve that receives hot gases from First valve 1011 and/or Primary Heater output 1020d and directs said gases to input of Waste Heat Recovery Heat Exchanger 2060c of End-Use Side Second modular part 200.

1020. First heat exchanger: an exchanger made of refractory material, adapted to withstand very high temperatures, that is heated by the hot gas flow received from valve 1011 through First input of the first heat exchanger 1020a and heats the compressed air flow received from Second heat exchanger 1060 (acting in part as Recuperator) through Second input of the first heat exchanger 1020b or alternately a chamber made of refractory material able to withstand very high temperatures that mixes hot gas flow received through First input of the first heat exchanger 1020a with the compressed air flow received through Second input of the first heat exchanger 1020b, in both cases said exchanger having a tapered cross-section imparting additional isothermal heat but adapted to avoid any undesirable supersonic flow.

1020a. First input of the first heat exchanger: port that connects heating side of First heat exchanger 1020 to refractory piping from First valve 1011.

1020b. Second input of the first heat exchanger: port that connects heated side of First heat exchanger 1020 to thermally insulated piping linking said exchanger to Second heat exchanger 1060.

1020c. First output of the first heat exchanger: port that connects the heated side of First heat exchanger 1020 to refractory piping linking said exchanger to First input of the first expander module 1030a.

1020d. Second output of the first heat exchanger: port that connects the heating side of First heat exchanger 1020 to thermally insulated piping linking said exchanger to Second valve 1012.

1025. First heat to power converter module: through First input of the first heat to power converter module 1025a, absorbs very high to medium temperature waste heat from First heat exchanger 1020 and converts it into direct electrical current using a variety of commercial heat to power conversion modules with said current transferred through First output of the first heat to power converter module 1025b to electrical wiring linking First heat to power converter module 1025 to First DC/AC power electronics and controls module 2070 of End-Use Side Second modular part 200.

1025a. First input of the first heat to power converter module: optional interface, as can be sourced commercially, that connects the adapted First heat exchanger 1020 to the First heat to power converter module 1025.

1025*b*. First output of the first heat to power converter module: electrical bus that connects First heat to power converter module 1025 to electrical wiring linking First heat to power converter module 1025 to First DC/AC power electronics and controls module 2070.

1030. First expander module: consists of at least one positive displacement machine of the screw type configured to operate as a gas expander, located in a thermally insulated, refractory enclosure, that receives through First input of the first expander module 1030 high temperature gases conveyed through refractory piping from First output of the first heat exchanger 1020*c*, expands them, in the process converting part of the heat flow to rotational mechanical power, and supplies expanded cooler gases downstream through Third output of the first expander module 1030*d*.

1030*a*. First input of the first expander module: configured as a port of variable aperture receiving high temperature gases conveyed through refractory piping from First output of the first heat exchanger 1020*c*.

1030*b*. First output of the first expander module: mechanical link that connects screw positive displacement component of First expander module 1030 to shaft linking said First expander module 1030 to First mechanical coupling module 1040, conveying to it mechanical rotational power.

1030*c*. Second output of the first expander module: mechanical link that connects screw positive displacement component of First expander module 1030 to shaft linking First expander module 1030 to First mechanical coupling and gear box module 1070, conveying to it mechanical rotational power.

1030*d*. Third output of the first expander module: port that supplies expanded cooler gases from First expander module 1030 through thermally insulated piping to Third input of the second heat exchanger 1060*c*.

1040. First mechanical coupling module: mechanical link that couples shaft conveying rotational mechanical power from First expander module 1030 with shaft conveying said mechanical power to First compressor module 1050.

1040*a*. First input of the first mechanical coupling module: mechanical link that connects shaft linking First expander module 1030 to First mechanical coupling module 1040.

1040*b*. First output of the first mechanical coupling module: mechanical link that connects shaft linking First mechanical coupling module 1040 to First compressor module 1050.

1050. First compressor module: consists of at least one positive displacement machine of the screw type as can be sourced commercially, configured to operate as a gas compressor, located in a thermally insulated enclosure, powered mechanically through Second input of the first compressor module 1050*b*, that receives through First input of the first compressor module 1050*a* air from First air filter module 1100, compresses it and supplies it upstream to through First output of the first compressor module 1050*c* to Third valve 1051.

1050*a*. First input of the first compressor module: configured as a port of variable aperture receiving air from air from First air filter module 1100 through piping.

1050*b*. Second input of the first compressor module: mechanical link that receives rotational mechanical power through shaft linking it to First output of the first mechanical coupling module 1040*b*.

1050*c*. First output of the first compressor module: port that connects First compressor module 1050 through thermally insulated piping to Third valve 1051.

1051. Third valve: consists in a three way regulating valve that receives compressed air from First compressor module through 1050 through First output of the first compressor module 1050*c* and directs it in part or wholly to Second input of the second heat exchanger 1060*b* and/or Fifth valve 1081.

1060. Second heat exchanger: made of refractory material able to withstand medium to high temperatures, is heated by the heat flow received from First expander module 1030 through thermally insulated piping connecting it to Third output of the first expander module 1030*d*, heats the compressed air flow received from Third valve 1051 through Second input of the second heat exchanger 1060*b*, and delivers said heated compressed air through First output of the second heat exchanger 1060*d* to First heat exchanger 1020.

1060*a*. First input of the second heat exchanger: port of variable aperture that receives optional Second thermal energy input 1002 consisting of waste heat recycled from upstream industrial processes.

1060*b*. Second input of the second heat exchanger: double port receiving compressed air from Third valve 1051 through thermally insulated piping or from First output of the first energy storage module 1090*b* through medium pressure piping.

1060*c*. Third input of the second heat exchanger: port receiving expanded medium temperature hot gases from First expander module 1030 through thermally insulated piping connecting it to Third output of the first expander module 1030*d*.

1060*d*. First output of the second heat exchanger: port conveying heated compressed air to Second input of the first heat exchanger 1020*b* through thermally insulated piping.

1060*e*. Second output of the second heat exchanger: port conveying cooled air from Second heat exchanger 1060 to Fourth valve 1061.

1060*f*. Fourth input of the second heat exchanger: port of variable aperture receiving medium temperature hot gases through thermally insulated piping connecting it to heat pump heat exchanger 2020 via control valve 2022.

1061. Fourth valve: four way regulating valve interfacing First modular part 100 (Primary Energy Side) with Second modular part 200 (End-Use Side) by receiving medium temperature compressed air from Second output of the second heat exchanger 1060*e* and/or from Fifth valve 1081 through thermally insulated piping.

1070. First mechanical coupling and gearbox module: mechanical module that interfaces First expander module 1030 of First modular part 100 with mechanical modules of Second modular part 200 as well as with energy storage and black start system of First modular part 100 and that comprises standard mechanical coupling and gearbox components.

1070*a*. First input of the first mechanical coupling and gearbox module: mechanical link that couples the First mechanical coupling and gearbox module 1070 with the shaft conveying rotational mechanical power from First expander module 1030 through Second output of the first expander module 1030*c*.

1070*b*. First output of the first mechanical coupling and gearbox module: mechanical link that couples the First mechanical coupling and gearbox module 1070 with First input of the first heat pump compressor module 2030*a* of Heat pump module 2000.

1070*c*. Second output of the first mechanical coupling and gearbox module: mechanical link that couples the First mechanical coupling and gearbox module 1070 with Second energy output 2003 of End-Use Side Interfaces 20 (Variable mechanical output) through a shaft.

1070*d*. Third output of the first mechanical coupling and gearbox module: mechanical link that couples the First mechanical coupling and gearbox module 1070 with Input of the variable speed generator and electronic control module 2040*a* of Second modular part 200.

1070*e*. Fourth output of the first mechanical coupling and gearbox module: mechanical link that couples the First mechanical coupling and gearbox module 1070 with First input of the second compressor module 1080*a* of First modular part 100.

1080. Second compressor module: small high pressure positive displacement air compressor optionally of piston or screw machine types, mechanically powered by rotational mechanical power supplied from the First mechanical coupling and gearbox module 1070 through the First input of the second compressor module 1080*a* and a shaft linking the latter to the Fourth output of the first mechanical coupling and gearbox module 1070*e*.

1080*a*. First input of the second compressor module: mechanical link that couples the Second compressor module 1080 with the Fourth output of the first mechanical coupling and gearbox module 1070*e* via a shaft.

1080*b*. Second input of the second compressor module: variable aperture port receiving compressed air from Fifth valve 1081 via thermally insulated piping.

1080*c*. First output of the second compressor module: port supplying high pressure compressed air to First energy storage module 1090 via thermally insulated high pressure piping.

1081. Fifth valve: three way regulating valve interfacing First modular part 100 (Primary Energy Side) with Second modular part 200 (End-Use Side) by receiving compressed air from Third valve 1051 and supplying it to Fourth valve 1061 and/or to First input of the second compressor module 1080*a*, both through medium pressure piping.

1090. First energy storage module: compressed air energy storage module as can be sourced commercially enabling black start of Core Brayton generator 1000, comprising a high pressure vessel typically able to store compressed air between 100 bar to 300 bar and ancillary heat exchangers, valves and controls, adapted to minimise waste heat during charging and discharging energy storage cycles, receiving compressed air through First input of the first energy storage module 1090*a* and supplying it to the Second input of the second heat exchanger 1060*b*.

1090*a*. First input of the first energy storage module: port receiving high pressure compressed air through high pressure piping from First output of the second compressor module 1080*c*.

1090*b*. First output of the first energy storage module: port supplying medium pressure compressed air to the Second input of the second heat exchanger 1060*b*.

1091. Sixth valve: one-way valve enabling ambient air input to First air filter module 1100.

1100. First air filter module: air filter as can be sourced commercially removing fine particles from ambient air from the environment of the Primary Energy Side Interfaces 10.

1100*a*. First input of the first air filter module: port receiving ambient air from Sixth valve 1091 through low pressure piping.

1100*b*. First output of the first air filter module: port supplying filtered ambient air from First air filter module 1100 to the First input of the first compressor module 1050*a*.

2000. Heat pump module: core heat pump module of Second modular part 200, optionally reversible, enabling the supply of a variety of high, medium to low temperature variable heat flows to End-Use Side Interfaces 20.

2001. Second thermal energy input: port of End-Use Side Interfaces 20 supplying low temperature heat from end-user's systems, through thermally insulated piping.

2002. First energy output: set of ports of End-Use Side Interfaces 20 supplying variable cooling to freezing or alternately heating energy output from Second modular part 200 through thermally insulated piping.

2003. Second energy output: mechanical coupling of End-Use Side Interfaces 20 supplying to End-User's systems variable mechanical rotational power output supplied from the Second output of the first mechanical coupling and gearbox module 1070*c* through a shaft.

2004. Third energy output: set of ports of End-Use Side Interfaces 20 supplying variable medium to low temperature heat output supplied from the Eighth valve 2012 of the Second modular part 200, through thermally insulated piping.

2005. Fourth energy output: set of ports of End-Use Side Interfaces 20 supplying variable high to medium temperature heat output supplied from the Fifth heat exchanger 2060 of the Second modular part 200, through thermally insulated piping.

2006. Fifth energy output: electrical bus of End-Use Side Interfaces 20 supplying variable electrical power output supplied from First DC/AC power electronics and controls module 2070 through electrical wiring.

2007. Broadband communication exchanges: WiFi and/or Ethernet Broadband communications connections with End-User's systems linking Communication module 2050 and End-User's communication devices.

2008. Ninth energy output: port receiving residual waste heat in the form of exhaust gases from Tenth valve 2061 and delivering them to a chimney or other End-User's systems.

2010. Third heat exchanger: exchanger module of the Heat pump module 2000, as can be sourced commercially, receiving air from Fourth valve 1061 through thermally insulated piping and the First input of the third heat exchanger 2010*a* and supplying it to Eighth valve 2012, while supplying to Seventh valve 2011 heat transmission fluid received from Ninth valve 2021.

2010*a*. First input of the third heat exchanger: port receiving air from Fourth valve 1061 through thermally insulated piping.

2010*b*. Second input of the third heat exchanger: port receiving heat transmission fluid from Ninth valve 2021 through thermally insulated piping.

2010*c*. First output of the third heat exchanger: port supplying air through thermally insulated piping to Eighth valve 2012 through thermally insulated piping.

2010*d*. Second output of the third heat exchanger: port supplying heat transmission fluid to Seventh valve 2011 through thermally insulated piping.

2011. Seventh valve: expansion valve of Heat pump module 2000.

2012. Eighth valve: three-way regulating valve receiving air from First output of the third heat exchanger 2010*c* and supplying it to Tenth valve 2061 and/or Third energy output port of End-Use Side Interfaces 20.

2020. Fourth heat exchanger: exchanger module of the Heat pump module 2000, as can be sourced commercially, connected to Seventh valve 2011 through thermally insulated piping and to Ninth valve 2021 concerning heat transfer fluid of Heat pump module 2000, receiving heat flow from Second thermal energy input port 2001 of End-Use Side Interfaces 20, and supplying heat to First energy output port 2002 of End-Use Side Interfaces 20.

2020a. First input of the fourth heat exchanger: port receiving heat transfer fluid from Seventh valve 2011 through thermally insulated piping.

2020b. Second input of the fourth heat exchanger: port receiving heat flow, as gas or liquid, from Second thermal energy input port 2001 of End-Use Side Interfaces 20, through thermally insulated piping.

2020c. First output of the fourth heat exchanger: port supplying heat transfer fluid to Ninth valve 2021, through thermally insulated piping.

2020d. Second output of the fourth heat exchanger: port supplying heat flow to First energy output port 2002 of End-Use Side Interfaces 20, through thermally insulated piping.

2021. Ninth valve: regulating four-way valve of Heat pump module 2000, optionally reversible, connecting Third heat exchanger 2010, Fourth heat exchanger 2020, and First heat pump compressor module 2030.

2022. Tenth valve: flow control valve connecting variably the second input 2020d of exchanger 2020 to first energy output 2002 of EUS 200 and to the fourth input 1060f of exchanger 1060 of PES 100.

2030. First heat pump compressor module: positive displacement compressor, optionally of the piston or screw types, as can be sourced commercially, that compresses the heat transfer fluid of Heat pump module 2000 and that is mechanically powered from First mechanical coupling and gearbox module 1070 of Primary Energy Side 100.

2030a. First input of the first heat pump compressor module: mechanical rotational power coupling with shaft supplying mechanical power from First mechanical coupling and gearbox module 1070.

2030b. Second input of the first heat pump compressor module: port of variable aperture receiving heat pump heat transfer fluid from Ninth valve 2021.

2030c. First output of the first heat pump compressor module: port supplying heat pump heat transfer fluid to Ninth valve 2021.

2040. Variable speed generator and electronic control module: comprise a variable speed electrical generator and set of power and ancillary control electronics as can be sourced commercially, mechanically powered from First mechanical coupling and gearbox module 1070.

2040a. Input of the variable speed generator and electronic control module: mechanical rotational power coupling with shaft supplying mechanical power from First mechanical coupling and gearbox module 1070.

2040b. Output of the variable speed generator and electronic control module: electrical bus supplying direct current to First DC/AC power electronics and controls module 2070.

2050. Communication module: communication and remote management module of End-Use Side, Second modular part 200 of the energy conversion device energy conversion device, as can be sourced commercially, using a variety of WiFI and/or Ethernet transmission means for links 2050a to 2050d.

2050a. First link of the communication module: set of communication links between the regulation components of the First modular part 100 of the energy conversion device and Communication module 2050.

2050b. Second link of the communication module: set of communication links between the regulation components of the Second modular part 200 of the energy conversion device and Communication module 2050.

2050c. Third link of the communication module: set of communication links between Communication module 2050 and the communication ports of End-Use Side Interfaces 20.

2050d. Fourth link of the communication module: communication link between Communication module 2050 and the Internet.

2060. Fifth heat exchanger: heat exchanger component of the Second modular part 200 enabling the transfer of medium to high temperature heat from Primary Energy Side module 100 to Fourth energy output port 2005 of End-Use Side Interfaces 20.

2060a. First input of the fifth heat exchanger: port receiving, through thermally insulated piping, air heat flow from Fourth valve 1061 that interfaces heat exchanges between First modular part 100 and Second modular part 200.

2060b. Second input of the fifth heat exchanger: optional regulating port admitting ambient air input into Fifth heat exchanger 2060 for its heating and optional mixing with air from Fourth valve 1061.

2060c. Third input of the fifth heat exchanger: port receiving hot gases from Second valve 1012, through thermally insulated piping.

2060d. First output of the fifth heat exchanger: port supplying hot air through thermally insulated piping to Fourth energy output 2005 port of End-Use Side Interfaces 20.

2060e. Second output of the fifth heat exchanger: port supplying exhaust gases to Tenth valve 2061, through thermally insulated piping.

2061. Tenth valve: three-way valve receiving exhaust gases from Second output of the fifth heat exchanger 2060e and/or Eighth valve 2021 through thermally insulated piping.

2065. First waste heat scavenging module: device, as can be sourced commercially, that absorbs waste heat from surface of Fifth heat exchanger 2060 and converts it into direct electrical current using a variety of commercial heat to power conversion modules with said current transferred through the first waste heat scavenging module 2065a bus to electrical wiring linking it to First DC/AC power electronics and controls module 2070 of End-Use Side Second modular part 200.

2065a. First output of the first waste heat scavenging module: electrical bus connecting First waste heat scavenging module 2065 to First DC/AC power electronics and controls module 2070 via electrical wiring.

2070. First DC/AC power electronics and controls module: commercially sourced module converting direct currents from First modular part 100 and End-Use Side Second modular part 200 to AC current, regulating such conversion, correcting the power factor and supplying said AC current and/or optionally DC current to Fifth energy output 2006 electrical bus of End-Use Side Interfaces 20.

2070a. First input of the first DC/AC power electronics and controls module: electrical bus receiving DC current from First heat to power converter module 1025.

2070b. Second input of the first DC/AC power electronics and controls module: electrical bus receiving DC current from First waste heat scavenging module 2065.

2070c. First output of the first DC/AC power electronics and controls module: electrical bus supplying AC current and/or optionally DC current to Fifth energy output 2006 electrical bus of End-Use Side Interfaces 20.

The invention claimed is:

1. An energy conversion device comprising at least one thermal energy input, a plurality of energy outputs, a first modular part and a second modular part, wherein:
   the first modular part comprises at least one thermal energy input among said at least energy input and at least a core Brayton generator;
   the second modular part comprises at least one energy output among said plurality of energy outputs, and comprises at least a heat pump and at least a heat exchanger;
   and wherein said heat pump cooperates with the core Brayton generator so that an output of a first heat exchanger of the core Brayton generator is connected to an input of a heat exchanger of the heat pump;
   and wherein the core Brayton generator comprises a compressor module and an expander module coupled with said compressor module, said compressor module being configured to be a positive displacement machine of a screw type, with the expander module being configured as a positive displacement machine of the screw type and supplying motive power to at least a compressor of the heat pump;
   and wherein the energy conversion device comprises at least:
      a plurality of heat exchangers, said plurality of heat exchangers comprising at least:
         said first heat exchanger of the core Brayton generator,
         said heat exchanger of the heat pump,
         a second heat exchanger of the core Brayton generator,
         said heat exchanger of the second modular part,
      each heat exchangers of said plurality of heat exchangers comprises at least a heating part comprising at least a heating output and at least a heated part comprising at least a heating input, wherein said heat pump cooperates with the core Brayton generator so that at least one heating output of said first heat exchanger of the core Brayton generator is connected to at least one heating input of the heat exchanger of the heat pump, and at least one heating output of said second heat exchanger of the core Brayton generator is connected to at least one heating input of said heat exchanger of the second modular part;
      a mechanical coupling and gear box module comprising a plurality of mechanical outputs configured to transfer mechanical energy from the first modular part to the second modular part, this plurality of mechanical outputs being configured so that the mechanical energy transferred by each mechanical output of the plurality of mechanical outputs can be varied relatively to one another;
      a set of valves, being configured to enable varying energy transfers between the first modular part, the second modular part and said plurality of energy outputs in function of variations of the mechanical energy transferred by the plurality of mechanical outputs from the first modular part to the second modular part; and
      a communication module receiving end-user energy flow requirements, this communication module being configured to operate at least both the plurality of mechanical outputs and the set of valves, in function of:
         at least a variable speed generator and electronic control module and a first DC/AC power electronics and controls module, and
         said end-user energy flow requirements.

2. The energy conversion device according to claim 1 wherein the core Brayton generator cooperates with said first heat exchanger of the core Brayton generator in order to operate an indirect heating recuperated Brayton-Ericsson cycle through.

3. The energy conversion device according to claim 1 comprising at least one electronic control module configured to manage each of the first modular part and the second modular part.

4. The energy conversion device according to any one of the claim 1 wherein the communication module is configured to remotely manage each of the first modular part and the second modular part.

5. The energy conversion device according to claim 1 comprising a second compressor module mechanically powered by rotational mechanical power supplied from the mechanical coupling and gearbox module in order to store energy in at least one energy storage module.

6. The energy conversion device according to claim 1 wherein the first modular part comprises a primary energy input module and a primary heater module, and wherein the primary energy input module is connected to the at least one thermal energy input, and is configured to supply the primary heater module with thermal energy from the at least one thermal energy input.

7. The energy conversion device according to claim 6 wherein the primary heater module comprises at least a first part and a second part, the first part being configured to supply heat to the expander module of the core indirect heating recuperated Brayton generator, and the second part being configured to transfer heat from the first modular part to the second modular part.

8. The energy conversion device according to claim 6 wherein the primary heater module is configured to thermally supply the expander module.

9. The energy conversion device according to claim 6 wherein the expander module is configured to receive energy from the primary heater module, wherein the first modular part comprises an energy storage module that supplies energy at least to the said heat exchanger of the energy storage module, said heat exchanger of the energy storage module supplying energy to the primary heater module.

10. The energy conversion device according to claim 1 wherein the expander module is configured to power the variable speed generator module.

11. The energy conversion device according to claim 1 wherein the core Brayton generator is configured to operate as a closed cycle using a dry gas as operating fluid, the dry gas being for instance taken among: pressurised air, carbon dioxide, nitrogen, helium.

12. The energy conversion device according to claim 1 wherein the set of valves comprises at least a plurality of electronically actuated regulating valves.

13. The energy conversion device according to claim 1 wherein at least a part of the set of valves is configured to enable varying heat transfers between the first modular part and the second modular part and varying individual energy output of the plurality of energy outputs independently from one another.

14. The energy conversion device according to claim 1 comprising at least one primary energy input module, and wherein the core Brayton generator is configured at least in part to operate a direct heating recuperated Brayton-Ericsson open cycle, and wherein the at least one primary energy input module is configured to supply heat to the first modular part and to the second modular part, and wherein the at least one primary energy input module is linked to the at least one thermal energy input, and wherein the at least one primary energy input module feeds heat directly downstream from the heat exchanger into a heat flow coming from the compressor and going to the heat exchanger.

15. The energy conversion device according to claim 1 wherein the first modular part comprises a primary heater module, wherein said first heat exchanger of the core Brayton generator is a recuperator module comprising at least a first part and a second part, and wherein the first part is configured to supply heat to an operating fluid circulating between the compressor module and the primary heater, and wherein the second part is a part of the heat pump.

16. The energy conversion device according to claim 1 wherein the heat pump comprises at least a heat pump compressor module and a heat pump cooling exchanger module.

17. A plurality of energy conversion devices according to claim 1 wherein the plurality of energy conversion devices are configured to form networkable devices located at and/or near distributed sites of energy use and adapted to achieve electrical power generation and energy use at end-users' sites.

18. An energy network comprising a plurality of energy conversion devices according to claim 17.

* * * * *